United States Patent
Kuwahara et al.

(10) Patent No.: US 6,395,419 B1
(45) Date of Patent: *May 28, 2002

(54) SOLID POLYMER ELECTROLYTE, METHOD OF MAKING, AND ELECTROCHEMICAL DEVICE USING THE SAME

(75) Inventors: Tsuneo Kuwahara; Satoshi Maruyama; Kazuhide Ohe, all of Chiba (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,401

(22) Filed: Feb. 12, 1998

(30) Foreign Application Priority Data

Mar. 28, 1997 (JP) .............................................. 9-095030

(51) Int. Cl.$^7$ ............................................. H01M 10/14
(52) U.S. Cl. ................... 429/129; 429/231.95
(58) Field of Search ............................ 429/30, 129, 41, 429/145, 231.95; 29/623.1–623.5

(56) References Cited

U.S. PATENT DOCUMENTS

| 4,099,218 A | * | 7/1978 | Klein et al. .................. 361/433 |
| 5,418,091 A | * | 5/1995 | Gozdz et al. ................ 429/252 |
| 5,631,103 A | * | 5/1997 | Eschbach et al. ........... 429/190 |

OTHER PUBLICATIONS

U.S. application No. 08/928,275, filed Sep.12, 1997, pending.

* cited by examiner

Primary Examiner—Stephen Kalafut
Assistant Examiner—M. Wills
(74) Attorney, Agent, or Firm—Oblon, Spivak, McClelland, Maier & Neustadt, P.C.

(57) ABSTRACT

A solid polymer electrolyte is prepared by forming a polymer solution containing a filler into a film, evaporating off the solvent from the film, and impregnating the film with an electrolytic solution. The impregnated polymer electrolyte has a swelling factor of at least 2.2. The method is efficient enough to produce the polymer electrolyte at a low cost. The polymer electrolyte is useful in electrochemical devices such as lithium secondary batteries and electric double layer capacitors.

9 Claims, No Drawings

SOLID POLYMER ELECTROLYTE, METHOD OF MAKING, AND ELECTROCHEMICAL DEVICE USING THE SAME

This invention relates to solid polymer electrolytes (SPE) suitable for use in electrochemical devices such as secondary batteries, capacitors, displays and sensors, a method for preparing the same, and electrochemical devices comprising the same.

BACKGROUND ART

Prior art electrochemical devices often use electrolytes of aqueous or non-aqueous solution. These electrolytes in solution form have drawbacks including the necessity of tight seal and the difficulty of insuring safety. There is an increasing need for ion conductive solid polymer electrolytes possessing desirable properties of flexibility, elasticity, light-weight, thin film formation, and transparency. Especially in the field of batteries which are most important among electronic articles of manufacture, efforts to develop secondary batteries using ion conductive polymers as the electrolyte have been made to meet the requirements of light-weight, compactness, freedom of geometrical design, and increased effective area.

Prior art examples using ion conductive polymers include uniform or dry type materials comprising polymers, for example, polyethers such as poly(ethylene oxide) (PEO) and poly(propylene oxide) (PPO) or derivatives thereof and electrolyte salts containing lithium or the like; hybrid or gel type materials comprising such polymers in admixture with plasticizers for improving electrochemical properties; and materials of the polymer-in-salt type having composite electrolyte salts carried on polymers.

The current research works to develop polymer batteries focus at solid polymer electrolytes (SPE) of the gel type because of their high ionic conductivity. Such polymers as PEO, PAN (polyacrylonitrile), and PVDF (poly(vinylidene fluoride)) are regarded promising for practical use. The gel type SPE is generally prepared by dissolving a polymer in a solvent, mixing the solution with an electrolytic solution, coating the solution to a substrate, and evaporating off the solvent to leave an SPE film. Alternatively, an SPE film is prepared by dissolving a polymer directly in an electrolytic solution, followed by coating or extrusion. Since most electrolytic solutions for use in electrochemical devices should be devoid of water, a dry atmosphere must be maintained in all the steps undertaken in the industrial manufacture of SPE by these processes. This requires substantial installation and maintenance costs, and the management of inventory is not easy.

Gozdz et al., U.S. Pat. No. 5,418,091 disclose a method for preparing SPE by adding a plasticizer to a polymer solution, coating the solution to a substrate, evaporating off the solvent to form a film, extracting the plasticizer from the film to leave pores in the film, and impregnating the film with an electrolytic solution so that the solution is imbibed in the pores. Since the electrolytic solution is used only in the impregnating/imbibing step, the preceding steps can be carried out under the ambient environment, enabling substantial reduction of the installation and maintenance costs. Additionally, the SPE can be stored in film form after the coating and drying steps or after the extraction of the plasticizer, ensuring the ease of inventory management. However, this method requires extraction step of dipping the plasticized polymer film in a large volume of solvent several times. This step not only causes a considerable drop of production efficiency or mass productivity, but also requires the disposal of a large volume of used solvent, which otherwise causes environmental pollution. The extraction can also be accomplished by heating the plasticized polymer film in vacuum. This alternative step, however, also affects production efficiency or mass productivity and necessitates an additional equipment and an additional cost.

For the manufacture of electrochemical devices using SPE, it is desired to have a method for preparing high performance SPE in an efficient manner using an inexpensive equipment.

SUMMARY OF THE INVENTION

An object of the invention is to provide a method for preparing a solid polymer electrolyte in an efficient, mass productive manner at a low cost. Another object of the invention is to provide a solid polymer electrolyte having a high swelling factor with electrolytic solution. A further object of the invention is to provide an electrochemical device using the solid polymer electrolyte and featuring low cost and high productivity.

According to the invention, there is provided a method for preparing a solid polymer electrolyte, comprising the steps of: forming a solution of a polymer and a filler in a solvent into a film; evaporating off the solvent from the film; and impregnating the film with an electrolytic solution.

By the method of the invention, there is produced a solid polymer electrolyte comprising a polymer matrix containing a particulate filler and an electrolytic solution incorporated therein. The solid polymer electrolyte preferably has a swelling factor of at least 2.2.

Also contemplated herein is an electrochemical device comprising the solid polymer electrolyte. Typical electrochemical devices are lithium secondary batteries and electric double layer capacitors.

The co-presence of the particulate filler allows the polymer to have a high swelling factor with an electrolytic solution. In general, a composite material comprising a polymer and a particulate filler has a swelling factor which does not exceed the swelling factor of the polymer alone if the inorganic non-porous filler particles are fully dispersed in the polymer and completely bound by the polymer on microscopic observation. Rather, the swelling factor of the composite material must be reduced from the swelling factor of the polymer alone by the volume fraction occupied by the filler particles. Nevertheless, the composite material of the invention has a higher swelling factor than the polymer alone probably because agglomeration of filler particles into secondary and third-order flocculated particles has occurred, the bonding state between the polymer and the filler, that is, the surface state of filler particles or the interface between the polymer and the filler has changed, and as a result, micro or meso pores have been formed in the composite material. Alternatively, pores can be positively formed in the composite material as by loading a filler having a higher swelling factor than the polymer or by effecting post treatment such as heating, stretching or crosslinking.

It is not permissible that the SPE is significantly reduced in strength by forming a composite material with the filler. In this respect, loading the polymer with a larger amount of a low strength filler is not practical. Loading the polymer with a larger amount of a filler having a low bonding force to the polymer results in SPE suffering from a loss of strength. Poor dispersion of a filler markedly exacerbates the strength and outer appearance of SPE.

It is noted that the polymeric film of U.S. Pat. No. 5,418,091 has a low ability to absorb electrolytic solution, that is, a low swelling factor. It is also described in this patent that the absorbancy of the polymer is increased or decreased by mixing a filler such as alumina or silica, but the absorbancy achieved thereby are not fully satisfactory. Additionally, the plasticizer extraction method employed in this patent is seriously disadvantageous in production efficiency and mass scale production.

DETAILED DESCRIPTION OF THE INVENTION

The solid polymer electrolyte (often abbreviated as SPE) of the invention is a matrix of a polymer and a filler containing an electrolytic solution. The SPE preferably has a swelling factor of at least 2.2.

Polymer

The polymer used herein is not critical. Preferably the polymer itself can be impregnated with some amount of an electrolytic solution because the SPE is subsequently impregnated with various electrolytic solutions for electrochemical devices. The intended use in electrochemical application requires that the polymer be stable against voltage and have satisfactory thermal and mechanical properties. For this reason, well-known gel type SPE polymers are preferable. Exemplary polymers include chemically crosslinked gels obtained by polymerizing an acrylate containing ethylene oxide which is a photopolymerizable monomer with a polyfunctional acrylate, polyacrylonitrile, poly (ethylene oxide), and poly(propylene oxide); and physically crosslinked gels based on fluorinated polymers such as poly(vinylidene fluoride) (PVDF), vinylidene fluoride-hexafluoropropylene copolymers, vinylidene fluoride-chlorotrifluoroethylene copolymers P(VDF-CTFE), vinylidene fluoride-hexafluoropropylene fluoro-rubber, vinylidene fluoride-tetrafluoroethylene-hexafluoropropylene fluoro-rubber, and vinylidene fluoride-tetrafluoroethylene-perfluoroalkyl vinyl ether fluoro-rubber. The preferred vinylidene fluoride base polymers contain at least 50% by weight, especially at least 70% by weight of vinylidene fluoride (VDF). Of the above-mentioned polymers, polyvinylidene fluoride, abbreviated as PVDF, copolymers of vinylidene fluoride (VDF) with hexafluoropropylene (HFP), and copolymers of vinylidene fluoride (VDF) with chlorotrifluoroethylene (CTFE), abbreviated as P(VDF-CTFE), are preferred.

These polymers are commercially available. For example, VDF-CTFE copolymers are commercially available under the trade name of Sefral Soft G150 and G180 from Central Glass K.K. and Solef 31508 from Nippon Solvay K.K. VDF-HFP copolymers are commercially available under the trade name of KynarFlex 2750 (VDF:HFP=85:15 wt %) and KynarFlex 2801 (VDF:HFP=90:10 wt %) from Elf Atochem and Solef 11008, Solef 11010, Solef 21508 and Solef 21510 from Nippon Solvay K.K.

Filler

The particulate filler used herein is not critical insofar as it forms a matrix with the polymer while micro or meso pores capable of imbibing an electrolytic solution are left at the interface with the polymer. No particular limits are imposed on the inorganic or organic nature, particle shape, particle diameter, density and surface state of the filler. Examples of the inorganic powder filler include oxides, carbonates and sulfates such as silicon oxide, titanium oxide, aluminum oxide, zinc oxide, calcium carbonate, calcium sulfate, tin oxide, chromium oxide, iron oxide, magnesium oxide, magnesium carbonate, and magnesium sulfate; carbides such as silicon carbide and calcium carbide; and nitrides such as silicon nitride and titanium nitride. Examples of the organic powder filler include various polymer particles which are not dissolved in the polymer matrix. These fillers preferably have a particle diameter of less than about 10 $\mu$m, more preferably 0.005 to 1 $\mu$m, especially 0.01 to 0.8 $\mu$m, though not critical, because the SPE generally has a thickness of less than about 100 $\mu$m when incorporated in electrochemical devices. The amount of the filler added is preferably about 5% to about 70% by weight based on the weight of the polymer although an appropriate mixing ratio varies with particular types of the polymer and the filler.

Electrolytic Solution

The electrolytic solution contains electrolytes in solvents. The solvents which do not undergo decomposition under a high voltage applied are preferred when the intended application to electrochemical devices such as lithium secondary batteries and capacitors is taken into account. Exemplary solvents are non-aqueous solvents including carbonates such as ethylene carbonate (EC), propylene carbonate (PC), butylene carbonate, dimethyl carbonate (DMC), diethyl carbonate, and ethyl methyl carbonate; and tetrahydrofuran (THF), 2-methyltetrahydrofuran, 1,3-dioxolan, 4-methyldioxolan, $\gamma$-butyrolactone, sulfolane, 3-methylsulfolane, dimethoxyethane, diethoxyethane, ethoxymethoxyethane, and ethyl diglyme.

The electrolyte used herein is selected from electrolyte salts in dissolved form such as $LiPF_6$, $LiClO_4$, $LiBF_4$, $LiAsF_6$, $LiSO_3CF_3$, and $(CF_3SO_2)_2NLi$ when used in lithium batteries. Also, quaternary ammonium salts such as tetraethylammonium perchlorate and tetraethylammonium fluroborate are useful as well as the foregoing alkali metal salts containing lithium when the electrolyte is used in electric double layer capacitors. An appropriate electrolyte salt compatible with the solvent may be selected from these and other examples depending on the electrochemical device to which the invention is applied. These electrolyte salts may be used in admixture of two or more while the mix ratio is arbitrary. The concentration of the electrolyte salt in the electrolytic solution of non-aqueous solvent system is preferably about 0.1 to 5 mol/liter while maximum conductivity is generally available at a concentration of about 1 mol/liter.

Swelling Factor

The swelling factor is a ratio of the weight of the polymer/filler matrix after impregnation with an electrolytic solution to the weight of the same matrix before impregnation. A swelling factor of 2 indicates that the weight of the polymer/filler matrix is increased twice by impregnation with an electrolytic solution, and in other words, that the total amount of the electrolytic solution retained in the polymer/filler matrix accounts for ½ of the overall weight of SPE. The electrolytic solution is retained in the polymer/filler matrix by way of swelling of the polymer itself, swelling of the filler in some cases, and penetration into pores in the polymer/filler matrix. When the total amount of the electrolytic solution accounts for ½ of the overall weight of SPE, however, the ionic conductivity of the SPE is lower than the ionic conductivity of the electrolytic solution by one order or more and thus often insufficient for application to electrochemical devices. It is thus desirable that the total amount of the electrolytic solution account for at least 55% of the overall weight of SPE. That is, a swelling factor of at least 2.2 is desirable. A proportion of the electrolytic solution in SPE of at least 60% or a swelling factor of at least 2.5 is more preferable. The upper limit of the swelling factor is usually about 4 although it depends on an appropriate compromise between swelling factor and strength.

Method

Now it is described how to prepare a solid polymer electrolyte. First of all, the polymer and the filler are dissolved and dispersed in a solvent. The solvent used herein is properly selected from those solvents in which the polymer is soluble while safe solvents preferably having high boiling temperature are appropriate from the industrial aspect. Examples of solvents are N,N-dimethylformamide (DMF), dimethylacetamide, N-methylpyrrolidone, acetone, methyl ethyl ketone (MEK), and methyl isobutyl ketone. The polymer is dissolved in the solvent in a concentration of about 5 to 30% by weight.

The dispersing/dissolving step may be carried out by dissolving the polymer in the solvent, adding filler particles to the polymer solution, and mixing the mixture for dispersion and dissolution at room temperature or elevated temperature using a mixer such as a magnetic stirrer or homogenizer or a dispersing mill such as a ball mill, super sand mill or pressure kneader.

The mixed solution of the polymer and the filler in the solvent is then coated or cast on a substrate to form a film. The substrate used herein may be any substrate having a smooth flat surface, for example, resins such as polyester film and polytetrafluoroethylene film and glass. Means for applying the mixed solution to the substrate is not critical and may be selected in accordance with the material and shape of the substrate. In general, dipping, spray coating, roll coating, doctor blade coating, gravure coating and screen printing techniques are useful.

After coating, the solvent is evaporated off from the mixed solution, leaving a film of the polymer/filler composite material. Drying may be done in vacuum or in air.

The film of the polymer/filler composite material is then immersed in an electrolytic solution whereby the film is impregnated with the electrolytic solution to produce a solid polymer electrolyte (SPE).

The SPE of the invention may be used in a variety of electrochemical devices such as lithium secondary batteries, electric double layer capacitors, EC displays, and sensors, especially lithium secondary batteries and electric double layer capacitors.

Lithium Secondary Battery

The lithium secondary battery using the gel electrolyte according to the invention is not particularly limited in structure although it is generally comprised of a positive electrode, a negative electrode, and the electrolyte of the invention and applicable to laminate batteries and cylindrical batteries.

The electrode to be combined with the gel electrolyte may be selected from well-known electrodes for conventional lithium secondary batteries. It may be formed of a composition comprising an electrode active material and the gel electrolyte.

The negative electrode is composed of a negative electrode active material such as carbon, lithium metal, lithium alloy or oxide materials while the positive electrode is composed of a positive electrode active material such as oxide or carbon capable of intercalating and deintercalating lithium ions.

The carbon used as the active material may be properly selected from natural or artificial graphite, resin pyrolyzed carbon materials, and carbon fibers. They are used in powder form. Preferred among these is graphite desirably having a mean particle size of 1 to 30 $\mu$m, especially 5 to 25 $\mu$m. Outside this range, a smaller mean particle size would lead to a shorter charge/discharge cycle life and a greater variation of capacitance (between individual batteries). A larger mean particle size would lead to a significantly greater variation of capacitance and a lower average capacitance. A larger mean particle size results in a greater variation of capacitance because the contact of graphite with the current collector and the contact between graphite particles becomes inconsistent.

Composite oxides containing lithium are preferred as the oxide capable of intercalating and deintercalating lithium ions. Such oxides are, for example, $LiCoO_2$, $LiMn_2O_4$, $LiNiO_2$, and $LiV_2O_4$.

Electric Double Layer Capacitor

The structure of the electric double layer capacitor in which the gel electrolyte of the invention is used is not critical. Usually the gel electrolyte serving as a separator is interleaved between a pair of polarizable electrodes. An insulating gasket is disposed at the periphery of the polarizing electrodes and the gel electrolyte. Such an electric double layer capacitor may be any of the coin, paper and laminated types.

A current collector used in the polarizable electrode may be formed of platinum or conductive rubber such as conductive butyl rubber or by plasma spreading metals such as aluminum and nickel or by attaching metal mesh to one surface of the electrode layer.

For the electric double layer capacitor, such polarizable electrodes are combined with the above-mentioned gel electrolyte. Included in the electrolyte salt are $(C_2H_5)_4NBF_4$, $(C_2H_5)_3CH_3NBF_4$, and $(C_2H_5)_4PBF_4$. The non-aqueous solvent used in the electrolytic solution may be selected from well-known various solvents, preferably electrochemically stable non-aqueous solvents such as propylene carbonate, ethylene carbonate, $\gamma$-butyrolactone, acetonitrile, dimethylformamide, 1,2-dimethoxyethane, and sulfolane, alone or in admixture of two or more. In the electrolytic solution of such non-aqueous solvent, the electrolyte may have a concentration of about 0.1 to 3 mol/liter.

An insulator such as polypropylene and butyl rubber may be used as the insulating gasket.

EXAMPLE

Examples of the present invention are given below by way of illustration and not by way of limitation.

Example 1

A polymer solution was prepared by mixing 3 grams of a polymer P(VDF-CTFE) containing about 15 mol % of CTFE and having a weight average molecular weight Mw of 120,000 with 27 grams of N,N-dimethylformamide (DMF) and agitating the mixture until the polymer was completely dissolved in DMF. Then 1 gram of ultrafine particulate titania P-25 ($TiO_2$ having a mean particle size of 21 nm by Nippon Aerosil K.K.) was added to the solution and thoroughly dispersed therein by means of a stirrer. Using an applicator having a clearance of 0.8 mm, the mixed solution was coated on a PET film of 80 $\mu$m thick whereupon the solvent (DMF) was evaporated off. The resulting composite film was immersed in an electrolytic solution of 1M $LiPF_6$ in ethylene carbonate (EC) and dimethyl carbonate (DMC) (EC:DMC=1:1, purity $\geq$99.5%, water content $\leq$50 ppm) in a glove box. After one hour, the composite film was taken out of the electrolytic solution and wiped off the solution on the surface. The SPE film thus obtained was 160 $\mu$m thick and measured for swelling factor and ionic conductivity. The swelling factor was 3.0. The ionic conductivity was as high as 4.0 mS/cm as measured by the method described below. The SPE film exhibited sufficient strength.

Measurement of Ionic Conductivity

A section of 2 cm$^2$ was cut out from the SPE film. The section was disposed between SUS electrodes to construct a test battery, which was placed in the glove box. The AC impedance between the electrodes was measured over the frequency range of 1 to 10$^6$ Hz using SI 1255 Model impedance analyzer by Solartron. The ionic conductivity was determined by complex impedance analysis.

Example 2

A polymer solution was prepared by mixing 3 grams of a polymer P(VDF-HFP) containing about 6 mol % of HFP and having a weight average molecular weight Mw of 380,000 with 27 grams of methyl ethyl ketone (MEK) and agitating the mixture until the polymer was completely dissolved in MEK. Then 3 grams of ultrafine particulate silica Aerosil-200 (SiO$_2$ having a mean particle size of 12 nm by Nippon Aerosil K.K.) was added to the solution and thoroughly dispersed therein by means of a stirrer. Using an applicator having a clearance of 0.8 mm, the mixed solution was coated on a PET film of 80 μm thick whereupon the solvent (MEK) was evaporated off. The resulting composite film was immersed in an electrolytic solution of 1M (C$_2$H$_5$)$_4$NBF$_4$ in propylene carbonate (PC) (purity ≧99.5%, water content ≦50 ppm) in a glove box. After one hour, the composite film was taken out of the electrolytic solution and wiped off the solution on the surface. On analysis, the SPE film thus obtained which was 180 μm thick had a swelling factor of 2.5 and an ionic conductivity as high as 6.4 mS/cm. The SPE film exhibited sufficient strength.

Example 3

A cup of a homogenizer was charged with 32.4 grams of DMF having a water content of less than 100 ppm and 10.8 grams of Sefral Soft G180F100 (VDF-CTFE copolymer by Central Glass K.K.). The homogenizer was operated at 10,000 rpm for 30 minutes to disperse and dissolve the copolymer in DMF while heating at a temperature of 80° C. To the solution was further added 27.6 grams of DMF. The homogenizer was operated again at 10,000 rpm for 30 minutes to disperse and dissolve the copolymer in DMF at 80° C. The solution was allowed to cool down and 19.2 grams of an electrolytic solution of 1M LiPF$_6$ in EC and PC (EC:PC=1:1, purity ≧99.5%, water content ≦50 ppm) was added thereto. The mixture was agitated at 5,000 rpm for 15 minutes, obtaining a gel electrolyte solution.

An another cup of the homogenizer was charged with 45 grams of the gel electrolyte solution, to which 10.8 grams of lithium cobaltate (particle size 2–3 μm, Seimi Chemical K.K.) and 1.35 grams of acetylene black HS-100 (Denki Kagaku Kogyo K.K.) were added. The homogenizer was operated for dispersion. Using a metal mask printer, the mixture thus obtained was printed on an aluminum foil of 30 mm×30 mm×30 μm (thick) as a circular spot having a diameter of 15 mm. The spot was kept for some time, allowing the DMF to evaporate off. A disc electrode of 0.15 mm thick was obtained.

On the disc electrode serving as a positive electrode, a disc section having a diameter of 25 mm cut out from the SPE film obtained in Example 1, a lithium foil having a diameter of 20 mm and a thickness of 0.1 mm, and a nickel foil of 30 mm×30 mm×35 μm (thick) were successively laid in the described order. The laminate was sealed on the periphery with a polyolefin base hot-melt adhesive, fabricating a lithium secondary battery. The battery was run through charge/discharge cycles between 4 volts and 2 volts at a current density of 0.1 mA/cm$^2$, indicating normal operation as a rechargeable battery.

Example 4

Using DMF having a water content of less than 100 ppm as a solvent, a gel electrolyte solution containing Sefral Soft G180:1M (C$_2$H$_5$)$_4$NBF$_4$/PC in a ratio of 30:70 wt % was prepared. A section of 15 mm diameter cut out from activated carbon fiber cloth (product code ACC507-20 by Gunei Chemical Industry K.K.). having plasma spread aluminum on one surface was immersed in 50 ml of the Sefral Soft electrolyte solution for 5 minutes. The impregnated cloth section was dried for 24 hours and used as a polarizable electrode. Using a pair of polarizable electrodes and a disc section having a diameter of 20 mm cut out from the SPE film obtained in Example 2 as a separator, a coin-shaped electric double layer capacitor was fabricated. The battery exhibited a capacitance of 25 F/g upon charge/discharge between 2 volts and 1 volt, indicating normal operation as a capacitor.

Comparative Example 1

A SPE film was prepared as in Example 1 except that the ultrafine particulate titania was omitted. When tested as in Example 1, this SPE had sufficient strength, but exhibited a swelling factor of 1.7 and an ionic conductivity of 0.2 mS/cm.

Comparative Example 2

A SPE film was prepared as in Example 2 except that the ultrafine particulate silica was omitted. When tested as in Example 2, this SPE had sufficient strength, but exhibited a swelling factor of 2.1 and an ionic conductivity of 2.0 mS/cm.

According to the invention, a high performance solid polymer electrolyte can be produced in a highly productive manner at a low cost. The solid polymer electrolyte has a high swelling factor and a high ionic conductivity. Using the solid polymer electrolyte, electrochemical devices can be produced in a highly productive manner at a low cost.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for preparing a solid polymer electrolyte, comprising the steps of:

forming a solution of a polymer and a filler in a solvent into a non-plasticized film, evaporating off the solvent from the non-plasticized film, and impregnating the non-plasticized film with an electrolytic solution, wherein (a) the solvent of the polymer/filler solution is different from the solvent of the electrolytic solution;

(b) evaporation is carried out without an extraction step of dipping the non-plasticized polymer film in a large volume of solvent several times or heating the non-plasticized polymer film in vacuum; and (c) forming and evaporating are carried out in an ambient environment without a need for a dry atmosphere.

2. A solid polymer electrolyte comprising a polymer matrix containing a particulate filler and an electrolytic solution incorporated therein, which has been prepared by the method of claim 1.

3. An electrochemical device comprising the solid polymer electrolyte of claim 2.

4. The electrochemical device of claim 3 which is a lithium secondary battery.

5. The electrochemical device of claim 3 which is an electric double layer capacitor.

6. The method of claim 1 wherein the solid polymer electrolyte has a swelling factor of at least 2.2.

7. A method for preparing a solid polymer electrolyte, comprising the steps of:

forming a solution of a polymer and a filler in a solvent into a non-plasticized film, evaporating off the solvent from the non-plasticized film, and impregnating the non-plasticized film with an electrolytic solution, thereby forming a solid polymer electrolyte film having a thickness of up to 180 microns, wherein
  (a) the solvent of the polymer/filler solution is different from the solvent of the electrolytic solution;
  (b) evaporation is carried out without an extraction step of dipping the non-plasticized polymer film in a large volume of solvent several times or heating the non-plasticized polymer film in vacuum; and
  (c) forming and evaporating are carried out in an ambient environment without a need for a dry atmosphere.

8. A method for preparing a solid polymer electrolyte, comprising the steps of:

forming a solution of a polymer and a filler having a particle diameter of less than about 10 microns in a solvent into a non-plasticized film, evaporating off the solvent from the non-plasticized film, and impregnating the non-plasticized film with an electrolytic solution, wherein
  (a) the solvent of the polymer/filler solution is different from the solvent of the electrolytic solution;
  (b) evaporation is carried out without an extraction step of dipping the non-plasticized polymer film in a large volume of solvent several times or heating the non-plasticized polymer film in vacuum; and
  (c) forming and evaporating are carried out in an ambient environment without a need for a dry atmosphere.

9. A method for preparing a solid polymer electrolyte, comprising the steps of:

forming a solution of a polymer and a filler having a particle diameter of less than about 10 microns in a solvent into a non-plasticized film, evaporating off the solvent from the non-plasticized film, and impregnating the non-plasticized film with an electrolytic solution, thereby forming a solid polymer electrolyte film having a thickness of up to 180 microns, wherein
  (a) the solvent of the polymer/filler solution is different from the solvent of the electrolytic solution;
  (b) evaporation is carried out without an extraction step of dipping the non-plasticized polymer film in a large volume of solvent several times or heating the non-plasticized polymer film in vacuum; and
  (c) forming and evaporating are carried out in an ambient environment without a need for a dry atmosphere.

* * * * *